United States Patent
Kang

(10) Patent No.: US 8,311,200 B2
(45) Date of Patent: Nov. 13, 2012

(54) METHOD FOR USER AUTHENTICATION, AND VIDEO COMMUNICATION APPARATUS AND DISPLAY APPARATUS THEREOF

(75) Inventor: Sung Suk Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 223 days.

(21) Appl. No.: 12/814,297

(22) Filed: Jun. 11, 2010

(65) Prior Publication Data

US 2011/0115877 A1    May 19, 2011

(30) Foreign Application Priority Data

Nov. 17, 2009    (KR) .................. 10-2009-0110889

(51) Int. Cl.
*H04M 11/00* (2006.01)

(52) U.S. Cl. ............... 379/202.01; 379/158; 379/93.21; 713/186; 348/14.08

(58) Field of Classification Search ............... 379/88.13, 379/93.21, 158, 202.01, 201.02; 348/14.08, 348/14.09, 14.1; 713/186, 168
See application file for complete search history.

(56) References Cited

U.S. PATENT DOCUMENTS 8,120,638 B2 * 2/2012 Kenoyer .................... 348/14.08
2007/0005988 A1 * 1/2007 Zhang et al. ................ 713/186
2010/0205667 A1 * 8/2010 Anderson et al. ............ 726/19
2011/0047377 A1 * 2/2011 Allen et al. .................. 713/168

FOREIGN PATENT DOCUMENTS

| KR | 1020050045773 A | 5/2005 |
| KR | 100725771 B1 | 6/2007 |
| KR | 1020070068612 A | 7/2007 |

* cited by examiner

*Primary Examiner* — Olisa Anwah
(74) *Attorney, Agent, or Firm* — Birch, Stewart, Kolasch & Birch, LLP

(57) ABSTRACT

The present invention relates to a method and apparatus for user authentication. According to an embodiment, the invention provides a method for user authentication in a video communication apparatus, the video communication apparatus including a user authentication unit, the method comprising: receiving image data of a plurality of users; detecting a face region of each of the plurality of users by using the received image data; performing, by the user authentication unit, a user authentication by comparing face feature information corresponding to each of the detected face regions with pre-registered face feature information; and permitting, by the user authentication unit, an access to a video communication service by a user corresponding to at least one of the detected face regions using the user authentication result.

17 Claims, 10 Drawing Sheets

METHOD FOR USER AUTHENTICATION, AND VIDEO COMMUNICATION APPARATUS AND DISPLAY APPARATUS THEREOF

CROSS-REFERENCE TO RELATED APPLICATIONS

Pursuant to 35 U.S.C. §119(a), this application claims the benefit of earlier filing date and right of priority to Korean Patent Application No. 10-2009-0110889 filed on Nov. 17, 2009, the contents of which are hereby incorporated by reference herein in their entirety

FIELD OF THE INVENTION

The present invention relates to a method and apparatus for user authentication and, more particularly, a method and apparatus for user authentication in a video communication system.

DISCUSSION OF THE RELATED ART

As digital-based digital TV technology has been developed and commercialized from the existing analog broadcasting, various kinds of contents services such as real-time broadcasting, contents on demand (COD), games, news, video communication, etc. can be provided to users by using the Internet accessed from houses in addition to the existing propagation media.

An example of the contents service provided by using the Internet may include the Internet protocol TV (IPTV). The IPTV transmits various information services, moving picture contents, broadcasts, etc. by using the high-speed Internet and provides them to a user's television.

SUMMARY OF THE INVENTION

The present invention provides a method and apparatus for user authentication, which address the limitations and disadvantages associated with the related art.

According to an embodiment of the present invention, a method for user authentication includes: receiving image data; detecting a face region existing within a region where image data is acquired by using the received image data; performing the user authentication by comparing information corresponding to the detected face regions, respectively with pre-registered information when the number of the detected face regions is 2 or more; and permitting the access of a user corresponding to at least one of the detected face regions in accordance with the user authentication result.

According to another embodiment of the present invention, a video communication apparatus includes: a camera that acquires image data; a face detection unit that detects two or more face regions existing within a region where the image data is acquired by using the acquired image data; a feature extraction unit that extracts feature information of each of the detected face regions; a storage unit that stores information on a registered face region; and a user authentication unit that performs user authentication for the detected face regions by comparing the feature information of each of the extracted face regions with information stored in the storage unit.

According to yet another embodiment of the present invention, a display apparatus includes: a data input unit that receives image data; a face detection unit that detects two or more face regions existing within a region where the image data is acquired by using the acquired image data; a storage unit that stores information on a registered face region; a user authentication unit that performs user authentication for the detected face regions by comparing the feature information of each of the extracted face regions with information stored in the storage unit; and a display unit that displays the detected face regions and the user authentication results for the detected face regions.

Meanwhile, the methods for user authentication may be implemented by a computer-readable recording medium in which program(s) to be executed is recorded, where the program(s) implement the steps of the methods according to the embodiments of the invention.

According to another embodiment of the present invention, there is provided a method for user authentication in a video communication apparatus, the video communication apparatus including a user authentication unit, the method comprising: receiving image data of a plurality of users; detecting a face region of each of the plurality of users by using the received image data; performing, by the user authentication unit, a user authentication by comparing face feature information corresponding to each of the detected face regions with pre-registered face feature information; and permitting, by the user authentication unit, an access to a video communication service by a user corresponding to at least one of the detected face regions using the user authentication result.

According to another embodiment of the present invention, there is provided video communication apparatus, comprising: a face detection unit configured to detect a face region of each of a plurality of users based on received image data of the plurality of users; and a user authentication unit configured to perform a user authentication by comparing face feature information corresponding to each of the detected face regions with pre-registered face feature information, and to permit an access to a video communication service by a user corresponding to at least one of the detected face regions using the user authentication result.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

DETAILED DESCRIPTION OF PREFERRED EMBODIMENTS

Hereinafter, a method for user authentication, and a video communication apparatus and a display apparatus thereof according to embodiments of the present invention will be described in detail with reference to the accompanying drawings.

Figure 1:
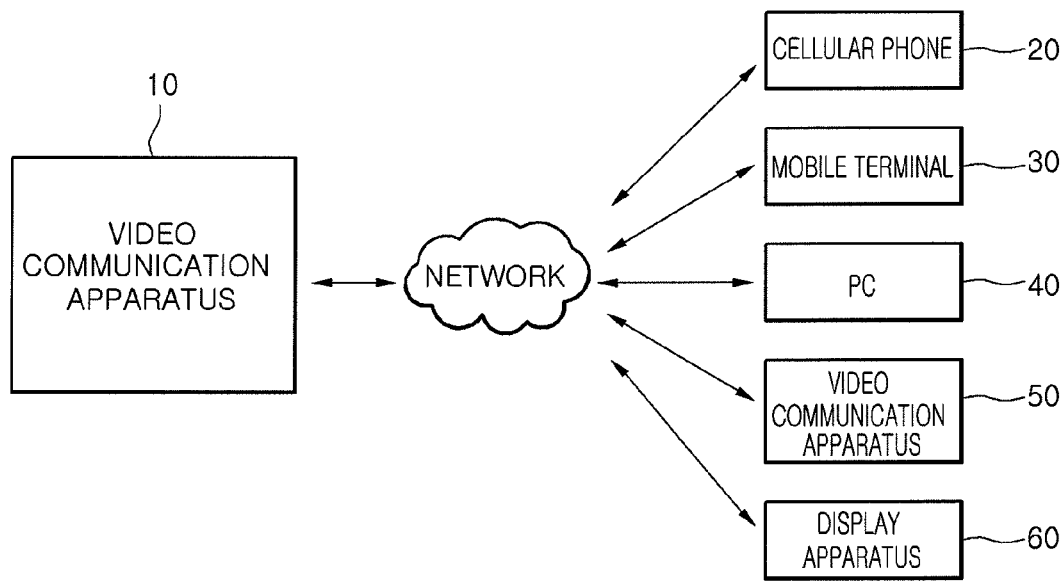
FIG. 1 is a block diagram illustrating a configuration of a video communication system according to an embodiment of the present invention.

FIG. 1 is a block diagram illustrating a configuration of a video communication system according to an embodiment of the present invention.

Referring to FIG. 1, the video communication system is a system to allow a calling party (i.e., party that places a call) and a called party (i.e., party that receives a call) to have a talk with each other while viewing images transmitted from counterparts by using a plurality of apparatuses which can process and transmit/receive video data and audio data. All components of the video communication system of the present invention are operatively coupled and configured.

For example, a video communication apparatus 10 may acquire video and audio data corresponding to a user's video and audio by using a camera and a microphone and an input device, and transmit the acquired video and audio data to one or more other apparatuses 20, 30, 40, 50 and 60 connected through wired and/or wireless network(s) such as the Internet, mobile network, etc.

Meanwhile, the video communication apparatus 10 may receive video and audio data from one or more other apparatuses 20 to 60 connected through the wired and/or wireless network(s). Therefore, video communication (e.g., video conference including audio communication) between the video communication apparatus 10 and the external apparatuses 20 to 60 may be performed. Here, the video communication includes audio only communication which can also occur between the video communication apparatus 10 and one or more external apparatuses 20 to 60.

As shown in FIG. 1, examples of the external apparatuses which can perform the video communication with the video communication apparatus 10 may include a cellular phone 20, a mobile terminal 30 such as a PDA, a tablet, a notebook, or the like, a PC 40 such as a desktop, workstation, etc., another video communication apparatus 50, and a display apparatus 60. The invention is not limited to such examples and encompasses other examples of the external apparatuses. Each of the video apparatus and external apparatuses 10 to 60 can communicate with one or more of the video apparatus and external apparatuses 10 to 60.

Further, the video and audio data can be transmitted and received in accordance with communication standards for the video communication on the networks connecting the external apparatuses 20 to 60 with the video communication apparatus 10.

For example, the video communication apparatus 10 and the external apparatuses 20 to 60 may transmit/receive the video and audio data by using a network based on the Ethernet, IEEE 802.3, or the like, or may transmit/receive the data by using a wireless network based on IEEE 802.11, or the like.

In addition, the data can be transmitted and received amongst the video communication apparatus 10 and the external apparatuses 20 to 60 by using a voice over broadband (VoBB) service, a legacy service, or the like on the network. For example, the VoBB may include services such as voice over cable modem (VoCM), voice over DSL (VoDSL), voice over Internet protocol (VoIP), fixed wireless access (FWA), fiber to the home (FTTH), or voice over ATM (VoATM). Meanwhile, the legacy service may include integrated service digital network (ISDN), a plain old telephone service (POTS), cellular or 3G service, etc.

Therefore, the video communication apparatus 10 and the external apparatuses 20 to 60 can transmit/receive the video data and the audio data amongst each other or other devices by using one or more networks such as a wireless network, the existing telephone network, a data network such as the Internet, etc., a cable modem system, or a cellular network, or the like.

The video communication apparatus 10 and the external apparatuses 20 to 60 can transmit/receive the video data and audio data to/from each other in accordance with set standard(s). For example, these apparatuses may use protocols such as H.261 standard for coding the video data, H.221 standard for communication of the video and audio data, and an H.242 standard for setting and canceling a call, etc.

More specifically, the video communication system using the Internet may use protocols implemented in accordance with H.323, H.263, and H264 standards for video coding and video communication standards such as G723.1, G.711, and G.729 for audio coding.

However, the video communication system according to the embodiments of the present invention is not limited to the above-mentioned configurations and encompasses other examples. For example, the apparatuses 20 to 60 that perform video communication with the video communication apparatus 10 are not limited to the apparatuses 20 to 60 shown in FIG. 1 and may use standards such as SIP, RTP/RTCP protocols in addition to the above-mentioned standards.

Figure 2:
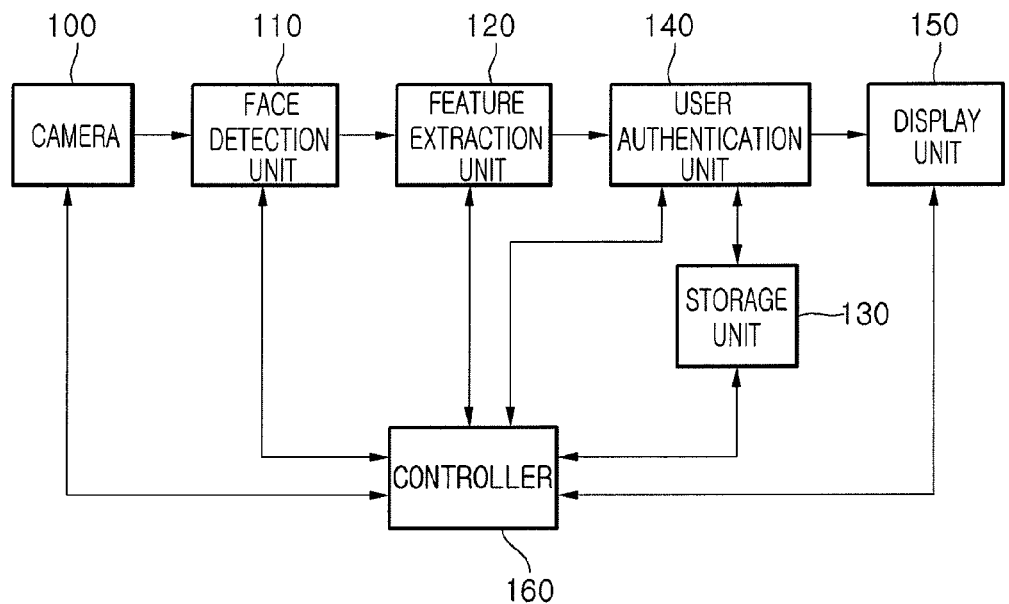
FIG. 2 is a block diagram illustrating a configuration of a video communication apparatus according to an embodiment of the present invention.

FIG. 2 is a block diagram illustrating an example of the video communication apparatus 10 according to an embodiment of the present invention. The video communication apparatus 10 may include a camera 100, a face detection unit 110, a feature extraction unit 120, a storage unit 130, a user authentication unit 140, and a controller 160 for controlling the operations of the video communication apparatus 10. The camera 100 is mere an example of an image capturing unit and the video communication apparatus 10 can have other type of image capturing unit as the unit 100. The video communication apparatus 10 may further include components for providing video communication services, such as a user input unit, a network interface unit, an audio output unit, etc. All the components of the video communication apparatus 10 are operatively configured and coupled.

Referring to FIG. 2, before an authentication process begins, a registration process may occur. The registration process can occur using the video communication apparatus 10 or by using another apparatus which sends the pre-registered information for storage into the storage unit 130 of the video communication apparatus 10. For instance, any user who desires to use the video communication service or the video communication apparatus may register oneself. For example, a user who desires to register can stand or show up in front of the camera 100. Then an image of that user can be captured by the camera 100 and the face detection unit 110 can detect a face region from the captured image of the user. The feature extraction unit 120 can extract feature information from the detected face region and stores this information in association with that user in the storage unit 130 as part of pre-registered information stored in the storage unit 130. In this manner, a plurality of different users can pre-register for the video communication service, and the storage unit 130 stores therein the pre-registered information which includes the extracted face feature information of each of the users that are pre-registered.

Thereafter, the video communication apparatus 10 captures an image of any user who desires to use the video communication service, compares the captured image with the pre-registered information, and selectively provides a user authentication process. For instance, if a particular desires to obtain the video communication service, then that user may appear before the video communication apparatus 10. The camera 100 photographs a region where the user is positioned and acquires video data corresponding thereto, and the face detection unit 110 detects a face region of the user in the photographed image by using the acquired video data.

Meanwhile, the video communication apparatus 10 may further include a pre-treatment unit (not shown) that improves the image quality of the video data acquired by the camera 100 or performs pre-treatment to adjust the video data to be suitable for a predetermined object to output the video data to the face detection unit 110. For example, the pre-processing unit may perform video processing such as contrast readjustment, noise removal, smoothing, sharpening, etc. of the acquired video data, which is known.

The feature extraction unit 120 extracts feature information of the detected face region. For example, the feature extraction unit 120 may extract one or more face feature vectors from the acquired video data corresponding to the detected face region of the user, to discriminate a difference between the user's face from the detected face region.

Meanwhile, as mentioned above, the storage unit 130 stores therein the pre-registered information, e.g., face feature information of a face of each registered user who is permitted to access the video communication apparatus 10 and/or the video communication service. More specifically, in accordance with a predetermined user registration process, a video image of the user is photographed by the camera 100 (or by a camera in other apparatus), and the feature information of the face region of the user may be extracted from the video data acquired by the camera 100 through the face detection unit 110 and the feature extraction unit 120, and then stored in the storage unit 130 as part of the pre-registered information.

Now, once the feature extraction unit 120 has obtained the face feature information of the detected face region of the particular user who currently desires to use the video communication service, the user authentication unit 140 performs user authentication for the detected face region of the particular user by comparing the pre-registered information stored in the storage unit 130 with the face feature information of the face region of the particular user extracted by the feature extraction unit 120.

Based on the comparison result, if the two pieces of information coincide with each other, the user authentication unit 140 permits the particular user to access the video communication apparatus 10/video communication service. That is, the user authentication unit 140 authenticates the user which in turn automatically authorizes the particular user's log-in to the apparatus 10. For instance, if the face feature information of the particular user currently obtained by the feature extraction unit 120 matches (or substantially matches) one of the face feature information of the pre-registered users stored in the storage unit 130, then the user authentication unit 140 authenticates the particular user and automatically logs-in that particular user for the video communication apparatus 10, so that the particular user can now access the video communication apparatus 10 and/or the video communication service using the video communication apparatus 10. Then the particular user can perform video communication/conference with one or more of the external apparatuses 20 to 60 using the video communication apparatus 10. Further, if the particularly user who is currently logged-in to the video communication apparatus 10/service moves away from the video communication apparatus 10 so that the camera 100 can no longer capture that user, then the video communication apparatus 10 automatically logs-out that user, e.g., after such a detection is made or after a predetermined time period has elapsed after that detection. Hereinafter, a method for user authentication according to an embodiment of the present invention will be described in more detail with reference to FIGS. 3 to 12.

Figure 3:
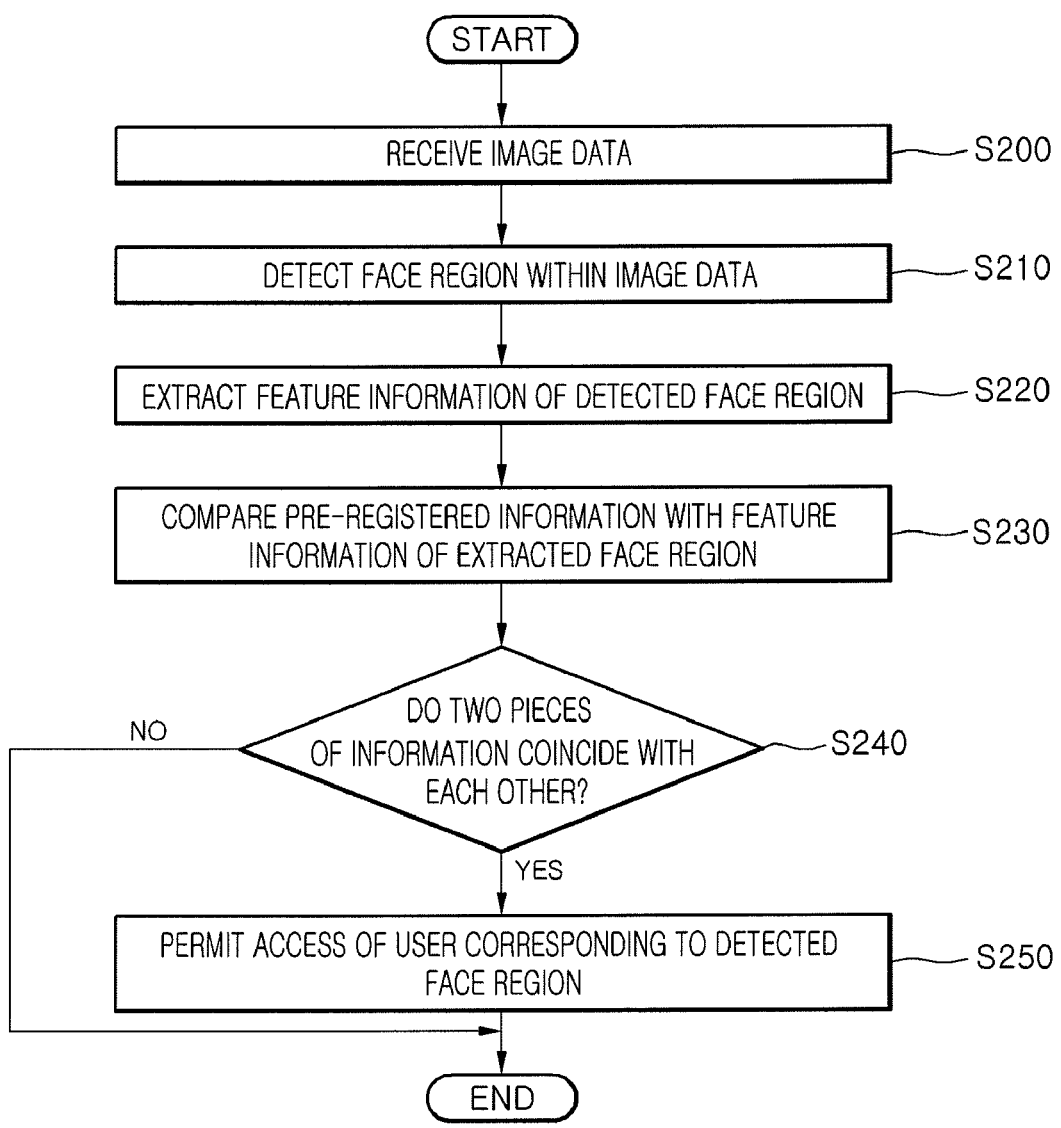
FIG. 3 is a flowchart illustrating a method for user authentication according to an embodiment of the present invention.

FIG. 3 is a flowchart illustrating a method for user authentication according to an embodiment of the present invention. The method for user authentication as implemented by the video communication apparatus 10 of FIGS. 1 and 2 will be described as an example. However, the methods of the present invention can be implemented in other suitable devices/systems.

Referring to FIG. 3, the face detection unit 110 of the video communication apparatus 10 receives video data from an image of a user (or part of the user) acquired by the camera 100 (step S200) and detects a face region existing in a region corresponding to the video data acquired using known detection techniques (step S210).

For example, the face detection unit 110 segments the received video data for each subject by outline detection, labeling, structural analysis, etc., and extracts a feature of each region from the segmented video data and compares the extracted feature with a predetermined stored face feature vector so as to detect the face region of the user.

Meanwhile, the face feature vector may also be stored in the storage unit 130.

The face detection unit 110 for detecting the face region may use a feature vector generated by extracting and processing features such as a color, a shape, a texture, etc. by applying mathematical, structural, and transform means to a region for each subject in order to detect the face region of the subject (user).

The feature extraction unit 120 extracts face feature information of the detected face region using known extraction techniques (step S220). For example, the feature extraction unit 120 may generate face feature vector(s) to discriminate a difference between individual faces from the detected face region and compare the generated face feature vector(s) with the registered user's face feature vector(s) prestored in the storage unit 130.

For example, the feature extraction unit 120 extracts an individual unique face region from the detected face region on the basis of differences in shape between different faces. For instance, the feature extraction unit 120 may extract one or more features of the corresponding face region, compares the extracted feature(s) with the prestored/preregistered information stored in the storage unit 130, and selectively authenticates the current user based on the comparison result. Here, the one or more features of the corresponding face region to be compared with the prestored/preregistered information may include, but are not limited to, sizes and/or intervals of eyes; colors of the pupils of the eyes; sizes, positions, lengths, and/or widths of ears; shapes and/or sizes of lips; shape and/or size of a jaw; shape and/or size of an entire facial outline; shape and/or size of a hair style; etc.

At the time of extracting the features of the detected face region, a mathematical model may generate the feature vector(s) by directly using values measuring the entire face or a predetermined part or an interval between predetermined parts of the face or processing the values through statics processing.

Meanwhile, the feature extraction unit 120 may extract the feature information of the detected face region by using hotelling (or Eigen vector, main component, discontinuous Karhunen-Loeve) transform, Fourier transform, DCT transform, Walsh function transform, wavelet transform, etc. For example, the method may be used for analysis of a texture for the detected face region.

Further, the feature extraction unit 120 may use an artificial neutral network such as a self-organized feature mapping (SOFM) network of Kohonen, etc. in order to extract the features of the detected face region.

The SOFM algorithm manufactures a vector quantizer by adjusting a connection weight from an input node to an output node. The output node is generally arranged in a 2-dimensional lattice form and the connection state of the output node can be extended by topically connecting neurons in learning. Therefore, the SOFM algorithm may efficiently convert a high-level input vector into a low-level feature vector and the output of the artificial neutral network may be used as the feature vector of the face region.

However, the present invention is not limited to the face region detection method and the feature information extraction method discussed above and in addition or in the alternative, may use other various known technologies.

After step S220, the user authentication unit 140 compares the pre-registered information stored in the storage unit 130 with the feature information of the detected face region extracted at step S220 (step S230), and determines whether or not the two pieces of information coincide with each other (step S240). For example, the user authentication unit 140 may perform the user authentication by comparing similarity or correlation between the extracted feature information of the detected face region of the current user and the stored registered users' face feature information.

In one example, the user authentication unit 140 may perform user authentication by comparing the face feature vectors and more specifically, may compare and analyze the stored registered users' face feature information with the extracted feature information of the detected face region by using an artificial neutral network using a backpropagation (BP) algorithm.

Meanwhile, by mathematically calculating the correlation between the extracted feature information of the detected face region and the stored registered users' face feature information, the user authentication unit 140 may determine whether or not the two pieces of information coincide with each other in accordance with the calculation result. According to an embodiment, the two pieces of information may not be identical to each other in order for the user authentication unit 140 to determine that the two pieces of information coincide with each other.

According to the determination, if the feature information of the extracted feature region is determined to coincide with one of the stored registered users' face feature information, the user authentication unit 140 authenticates a current user and permits the current user corresponding to the detected face region to access the video communication apparatus 10 (step S250). On the other hand, if the two pieces information do not coincide at step S240, the current user is not authenticated and is denied access to the video communication apparatus 10 and/or video communication service and the process may end.

For instance, when the two pieces of information coincide with each other, the user authentication unit 140 allows the user who currently attempts to log-in to be logged-in automatically and to access the video communication apparatus 10, for example, permitting execution of an application program stored therein for video communication.

Here, the two pieces of information may be said to coincide with each other, when the two pieces of information completely coincide with each other and/or when the two pieces of information have similarly of a predetermined reference value or more.

Now, various examples of user authentication methods will be discussed according to the invention. These methods can be implemented in the system of FIGS. 1-2 and/or according to the steps of FIG. 3.

Figure 4:
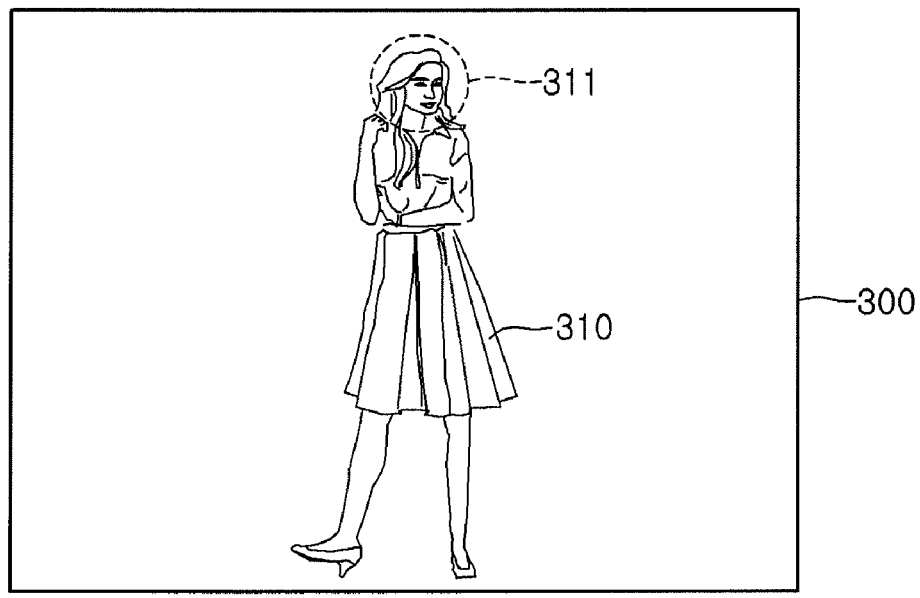
FIG. 4 is a diagram for describing a first embodiment of a method for user authentication according to the present invention.

FIG. 4 is a diagram for describing a first embodiment of a method for user authentication according to the present invention and illustrates one example of an image acquired by the camera 100 of the video communication apparatus 10.

Referring to FIG. 4, an entire image 300 corresponding video data outputted from the camera 100 may include an image 310 corresponding to a user and the user may be a person who wants to log in the video communication apparatus 10. For instance, the person displayed in the image 310 is the person who currently stands before the video communication apparatus 10 and who wants to access the video communication apparatus 10.

The face detection unit 110 of the video communication apparatus 10 may detect the user's face region 311 from the captured image 300 by using the video data outputted from the camera 100.

The feature extraction unit 120 may extract feature information, for example, the face feature vectors from the detected face region 311.

Further, the user authentication unit 140 may perform the user authentication by comparing the feature information of the face region 311 outputted from the feature extraction unit 120 with one or more registered users' face region feature information stored in the storage unit 130. To store the registered users' face feature information, the face region feature information for each of a plurality of registered users may be stored in the storage unit 130. Then the user authentication unit 140 may determine whether or not any of the stored information coincides (i.e., has a correlation) with the feature information of the extracted face region 311.

When the stored information coincides with the feature information of the face region 311, the user authentication unit 140 permits the user corresponding to the person image 310 existing in the image 300 (that is, the user who wants to log in the video communication apparatus 10) to access the vide communication apparatus 10. That is, the user authentication unit 140 authenticates the current user and automatically logs-in the user to the video communication apparatus 10. Therefore, the video communication apparatus 10 may enter a video-communication mode.

Meanwhile, when no stored feature information coincides with the feature information of the face region 311 among the stored information, the user authentication fails and the user authentication unit 140 disallows the user to access the video communication apparatus 10 and in addition, may perform an operation for registering the current user as a new user so that the current user may have access to the video communication apparatus 10 in the future.

The operations of the face detection unit 110, the feature extraction unit 120, and the user authentication unit 140 may be the same as the operations described by referring to FIGS. 2 and 3.

Further, when the user authentication is completed to permit the user to access the video communication apparatus 10, the camera 100 may photography primarily the user's face region 311 and the photographed image data (of the user's face region 311) may be transmitted to a counterpart apparatus through a network. For instance, other apparatus (e.g., apparatuses 20-60) may perform the user authentication based on the photographed image data of the user's face region 311 transmitted from the video communication apparatus 10 via the network.

According to an embodiment of the present invention, a plurality of users may be positioned simultaneously in front of the video communication apparatus 10, more specifically, in the region to be photographed by the camera 100. For example, in case of a display device having the video communication apparatus 10 according to an embodiment of the present invention, a plurality of users can view a broadcast displayed on the display device and the plurality of users may be positioned within the region photographed by the camera 100 in the display device when the users want to perform video communication while viewing the broadcast being displayed on the display device.

In this case, the video communication apparatus 10 included in the display device according to an embodiment of the present invention can perform the user authentication method described by referring to FIGS. 2 to 4 for each of the plurality of users, and can permit one or more users among the plurality of users to access the video communication apparatus 10 in accordance with the user authentication results.

Hereinafter, a method for user authentication according a second embodiment of the present invention will be described with reference to FIGS. 5 to 12.

Figure 5:
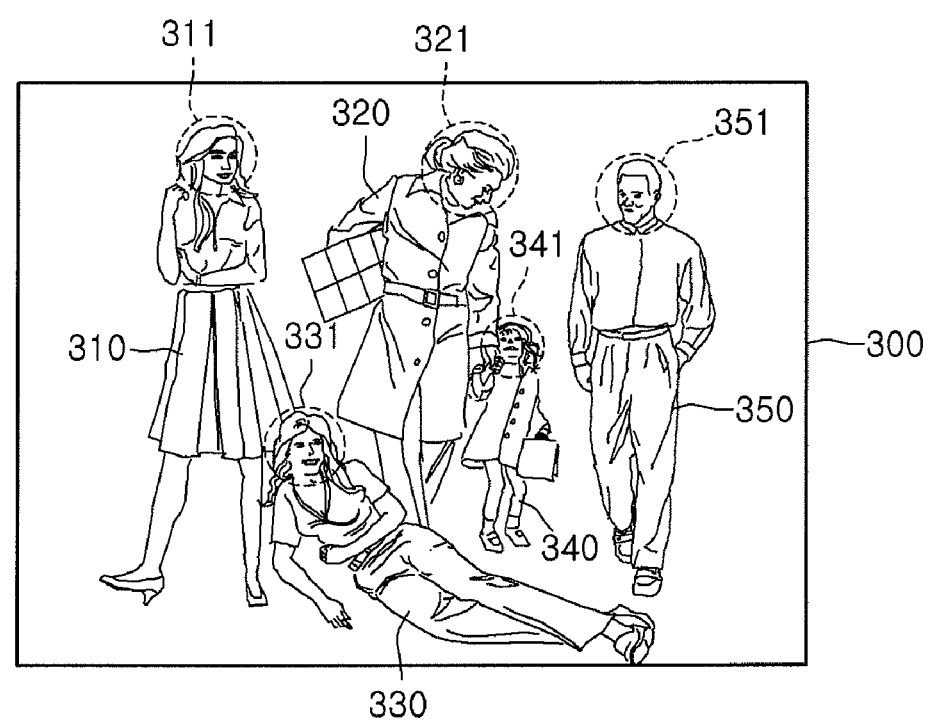
FIGS. 5 to 12 are diagrams for describing a second embodiment of a method for user authentication according to the present invention.

Referring to FIG. 5, two or more users may be positioned within the region to be photographed by the camera 100 of the video communication apparatus 10 for the user authentication.

For example, the entire image 300 based on the image data acquired by the camera 100 may include two or images 310, 320, 330, 340, and 350 corresponding to two or more users, respectively. Therefore, the face detection unit 110 may detect two or more face regions 311 321, 331, 341, and 351.

For example, two or more regions that coincide (e.g., have a correlation) with the face feature vector(s) or face feature information stored in the storage unit 130 may exist within the image data acquired by the camera 100.

Meanwhile, the feature extraction unit 120 may perform the feature information extraction operation for each of the two or more detected face regions 311, 321, 331, 341, and 351 so as to output the face feature vector(s) of each of the face regions 311, 321, 331, 341, and 351.

The user authentication unit 140 may perform the user authentication by comparing the registered users' face region feature information stored in the storage unit 130 with the feature information of each of the plurality of face regions 311, 321, 331, 341, and 351 outputted from the feature extraction unit 120.

For example, the user authentication unit 140 may determine whether or not any face region among the plurality of extracted face regions 311, 321, 331, 341, and 351 has feature information that coincides with the stored feature information stored in the storage unit 130.

If any of the stored feature information of the registered users as stored in the storage unit 130 coincides with the feature information of any of the detected face regions 311, 321, 331, 341, and 351 exists, the user authentication unit 140 authenticates the user(s) of those face regions having the feature information that coincides with the stored feature information and thereby permits those user(s) to access the video communication apparatus 10. Therefore, the video communication apparatus 10 may enter a video-communication mode and those user(s) can perform video communications with one or more of the apparatuses 20-60 via the network or via other connections.

When the face region having the feature information that coincides with the stored feature information among the detected face regions 311, 321, 331, 341, and 351 does not exist, the user authentication unit 140 does not allow selectively those users to access the video communication apparatus 10 or does not allow any of the users (310, 320, 330, 340, 350) to access the video communication apparatus 10.

The operations that the face detection unit 110, the feature extraction unit 120, and the user authentication unit 140 perform for the detected face regions 311, 321, 331, 341, and 351 may be the same as the operations described by referring to FIGS. 2 and 3.

For example, the video communication apparatus 10 according to the embodiment of the present invention can repetitively perform steps S220 to S250 described by referring to FIG. 3 for each of the plurality of detected face regions 311, 321, 331, 341, and 351.

According to the embodiment of the present invention, the video communication apparatus 10 may further include a display unit 150 and the display unit 150 may display the face region 311 (or other face regions 321, 331, 341, 351, etc.) detected by the face detection unit 110 on the screen of the display unit 150.

Figure 6:
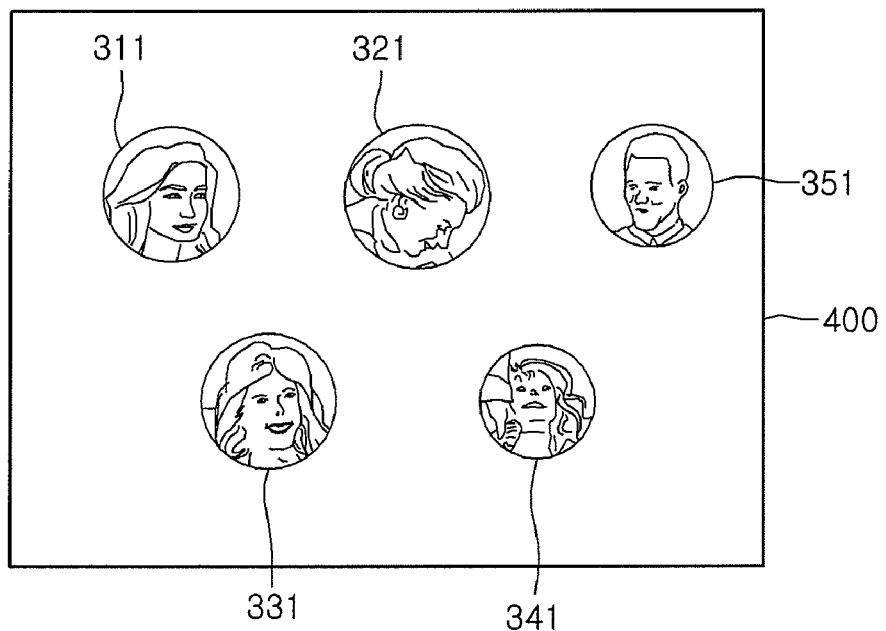

For example, referring to FIG. 6, as described above, when two or more face regions 311, 321, 331, 341, and 351 are detected in the image data acquired by the camera 100, the display unit 150 may display the detected face regions 311, 321, 331, 341, and 351 on a screen 400 of the display unit 150 of the video communication apparatus 10.

Further, the display unit 150 may display the user authentication result performed for each of the detected face regions 311, 321, 331, 341, and 351 on the screen 400.

For example, the face regions 311, 321, 331, 341, and 351 displayed on the screen 400 may be displayed to indicate authenticated users and unauthenticated users, which may can be visually discriminated. Therefore, a user who can log in the video communication apparatus 10 and a user who cannot log in the video communication apparatus 10 may easily be identified on the screen 400 among the users who are positioned in front of the video communication apparatus 10.

Figure 7:
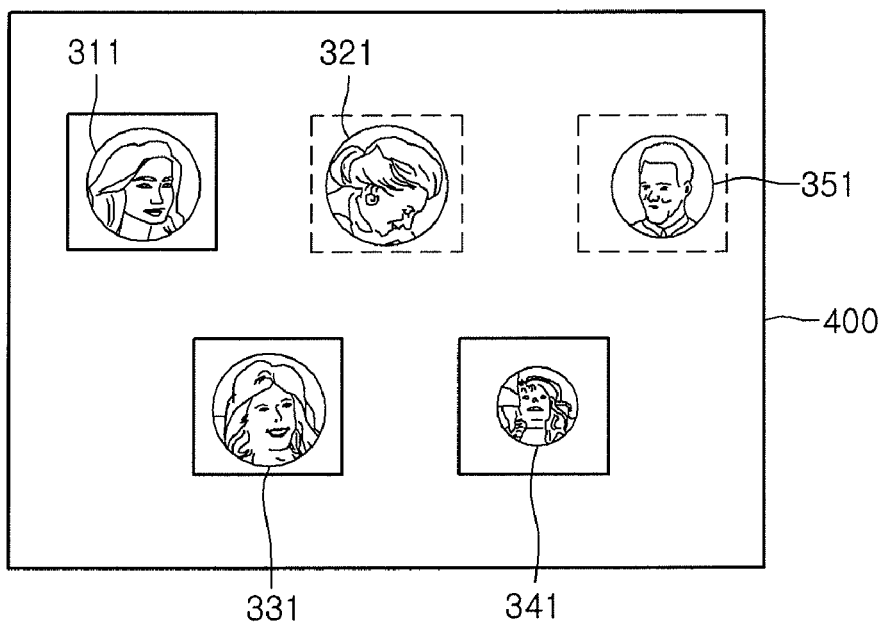

For example, referring to FIG. 7, a predetermined shape (e.g., a rectangular shape) may be displayed on the screen 400 so as to correspond to each of the detected face regions 311, 321, 331, 341, and 351, and the user authentication result for each of the detected faces/users may be displayed by the shapes displayed on the screen 400. For example, among the face regions 311, 321, 331, 341, and 351 displayed on the screen 400 in FIG. 7, the face regions 311, 331, and 341 are displayed by the rectangular solid lines, which indicate them as the authenticated users (e.g., the user who can log in the video communication apparatus 10) in accordance with the user authentication operation, whereas the face regions 321 and 351 are displayed by the rectangular dotted lines, which indicate them as the unauthenticated users (e.g., the user who cannot log in the video communication apparatus 10).

As shown in FIG. 7, each user can easily verify whether or not the user can log in to its own video communication service by using the information displayed on the screen 400.

Meanwhile, since the display method shown in FIG. 7 is just one example of the present invention, the present invention is not limited thereto. Accordingly, the user authentication method according to the present invention can adopt various methods to independently display the detected face regions 311, 321, 331, 341, and 351 in accordance with the user authentication result in addition to the example shown in FIG. 7. For example, different colors, different sizes, different symbols, different highlights, different sounds, different texts, or any combination thereof, etc. may be used to visually indicate the face regions of the authenticated users different from the face regions of the unauthenticated users on the screen 400.

Further, the user can select any one face region from the face regions 311, 321, 331, 341, and 351 displayed on the screen 400 (e.g., via an input unit of the video communication apparatus 10), and then the operation corresponding to the selected face region may be performed.

For example, when any one face region is selected from the face regions displayed as the user who can log in the video communication apparatus 10 on the screen 400 (e.g., among the face regions 311, 331, and 341 displayed by the rectangular solid lines), the access to the video communication apparatus by the user corresponding to each of the selected face region(s) is permitted. Therefore, the video communication apparatus 10 enters the video communication mode to execute application programs for any operation associated thereto.

Meanwhile, when any one face region is selected from the face regions displayed as the user who cannot log in the video communication apparatus 10 on the screen 400 (e.g., among the face regions 321 and 351 displayed by the rectangular dotted lines), the access to the video communication apparatus 10 is disallowed and information indicating that log-in is unavailable may be displayed on the screen 400.

Figure 8:
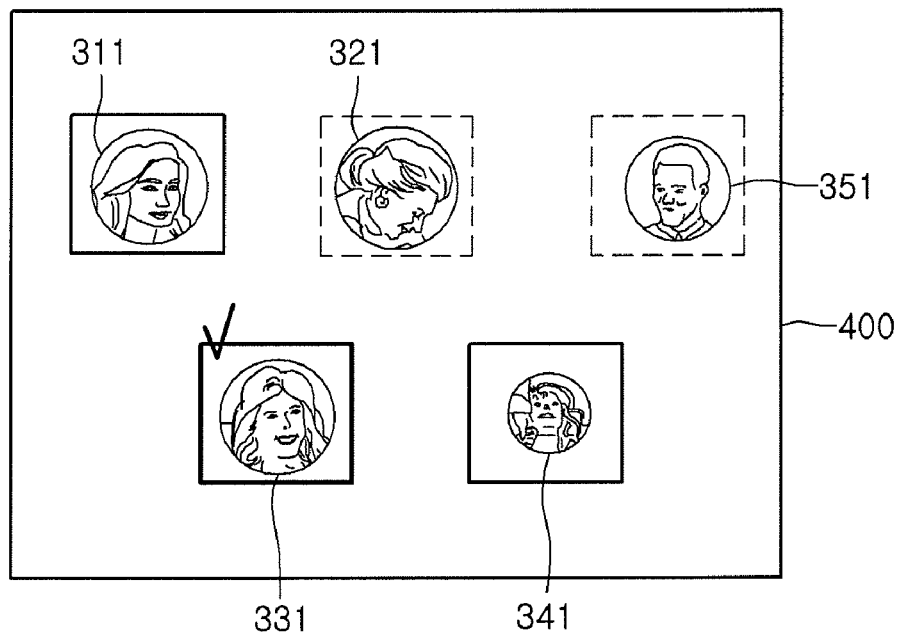

Referring to FIG. 8, in this example, a current user (e.g., user 3 corresponding to the face region 331) may select the face region 331 displayed as the user who can log in the video communication apparatus 10 on the screen 400 by using key buttons or other input unit provided in the video communication apparatus 10 or a remote controller for controlling the video communication apparatus 10. As a result, once the face region 331 is selected, this selection can be indicated on the screen 400 in various ways. In this example, the selection is indicated as the rectangular solid lines of the selected face region 31 change to rectangular bold solid lines. Other examples are possible.

Figure 9:
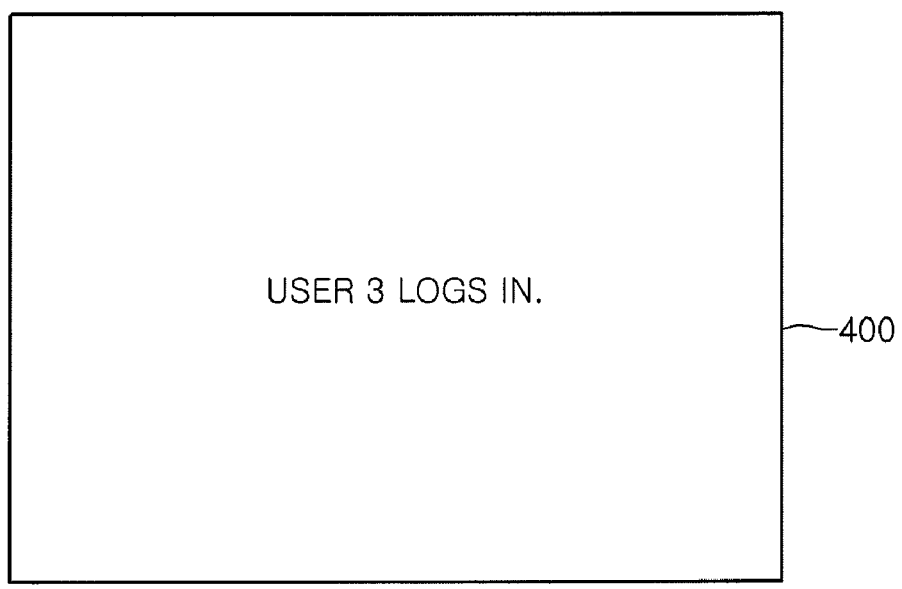

In this case, the access by the user 3 corresponding to the selected face region 331 to the video communication apparatus 10 is permitted and as shown in FIG. 9, information indicating that the user 3 logs in the video communication apparatus 10 may be displayed on the screen 400.

Figure 10:
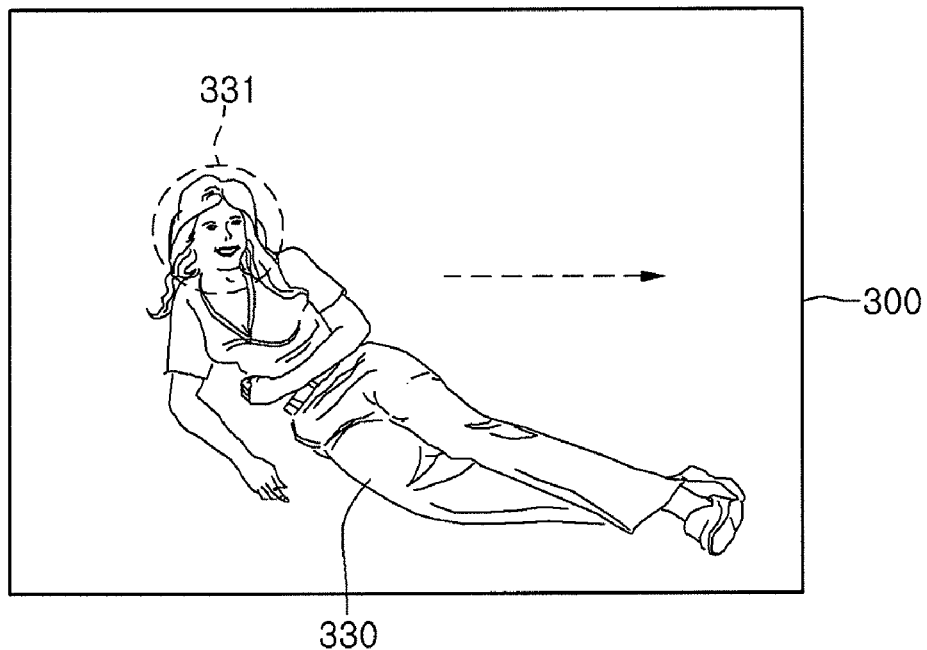

Thereafter, as shown in FIG. 10, the camera 100 may photograph the image 300 primarily centering on the image 330 corresponding to the user 3 who has logged in to the video communication apparatus 10 and as described above, the image data acquired primarily by the user 3 may be transmitted to a counterpart apparatus (e.g., one or more of the apparatuses 20-60) by using wired/wireless networks.

Further, the video communication apparatus 10 may be configured to change the direction of the camera 100 depending on the movement of the user 3 by using the face region 331 of the user 3 who has logged in to the video communication apparatus 10 and may further include a camera driving unit for implement this operation.

For example, the camera driving unit may detect the position of the face region 331 (of the currently logged-in user) within the image 300 photographed by receiving the image data acquired by the camera 100, and adjust the photographing direction of the camera 100 so that the face region 331 is positioned within the image 300. In this regard, in one example, if the user 3 who has successfully logged in to the video communication apparatus 10 moves in an arrow direction (e.g., a right direction) during the video communication or video conferencing, the camera driving unit may shift the photographing direction of the camera 100 to the right (or other appropriate direction) depending on the movement direction of the face region 331. That is, while the video communication is active by the user 3, the camera 100 may be configured to move in accordance with the movement of the face region 331 of the user 3 so that the face region 331 of the user 3 is always captured and/or displayed on the screen 400 even when the user 3 moves around before the video communication apparatus 10.

Meanwhile, a part of the operation of the above-mentioned camera driving unit may be performed by the face detection unit 110, the feature extraction unit 120, or the user authentication unit 140.

According to another embodiment of the present invention, the video communication apparatus 10 may collect and store a video communication history of the user 3 who logs in to the video communication apparatus 10 in the storage unit 130. For example, a communication timing, a communication time, information on a communication counterpart, or the like associated with the user of the video communication apparatus 10 or the video communication service may be collected and stored in the storage unit 130. Such collection and storage of the video communication history may be performed by the controller 160 or other component within the video communication apparatus 10.

The collected video communication history may be stored in the storage unit 130 to correspond to each corresponding user and the stored video communication history for each user may be used in link with a business model that provides user-customized information, for example, education, merchandizes, medical information, etc. Further, a central device such as a web server may manage, store, and transmit such collected video communication history from each of the associated apparatuses 10, 20, 30, 40, 50, 60, etc. to any of the associated apparatuses or other location.

Figure 11:
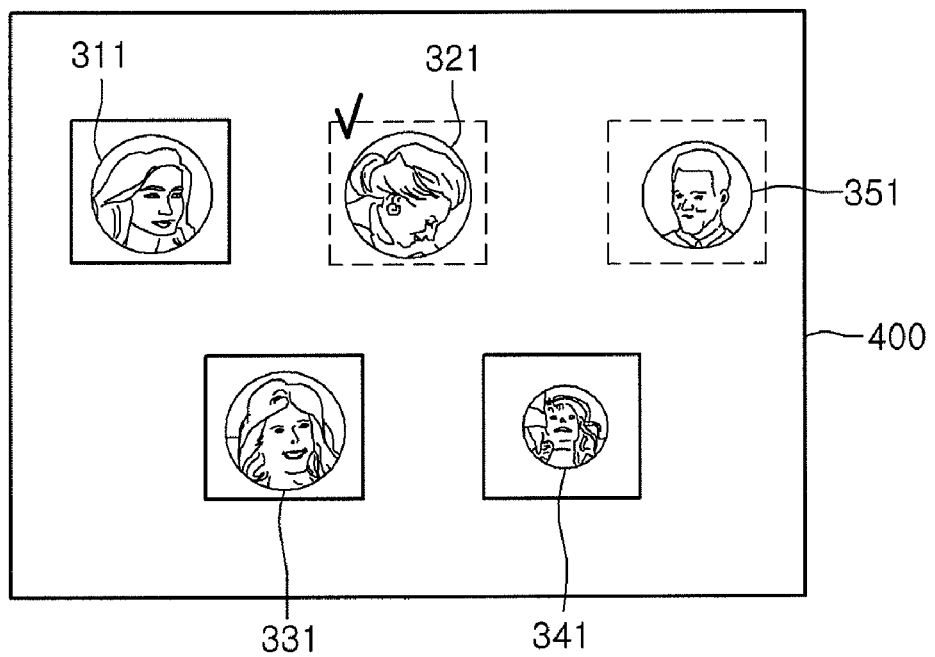

In another example, referring to FIG. 11, a current user (e.g., user 2) can select the face region 321 of the user 2 displayed as the user who cannot log in the video communication apparatus 10 on the screen 400 by using key buttons or other input unit provided in the video communication apparatus 10 or the remote controller for controlling the video communication apparatus 10.

In this case, a user registration operation for the user 2 corresponding to the selected face region 321 may be performed. For example, the feature information extracted by the feature extraction unit 120 for the selected face region 321 may be stored in the storage unit 130 in addition to user information (e.g., user's name, ID, nickname, icon representing the user, phone number, e-mail address, relationship, etc.). Therefore, the user 2 can register as the user who can log in to the video communication apparatus 10 by selecting the face region 321 on the screen 400 and then inputting appropriate registration information via the input unit of the video communication apparatus 10.

Figure 12:
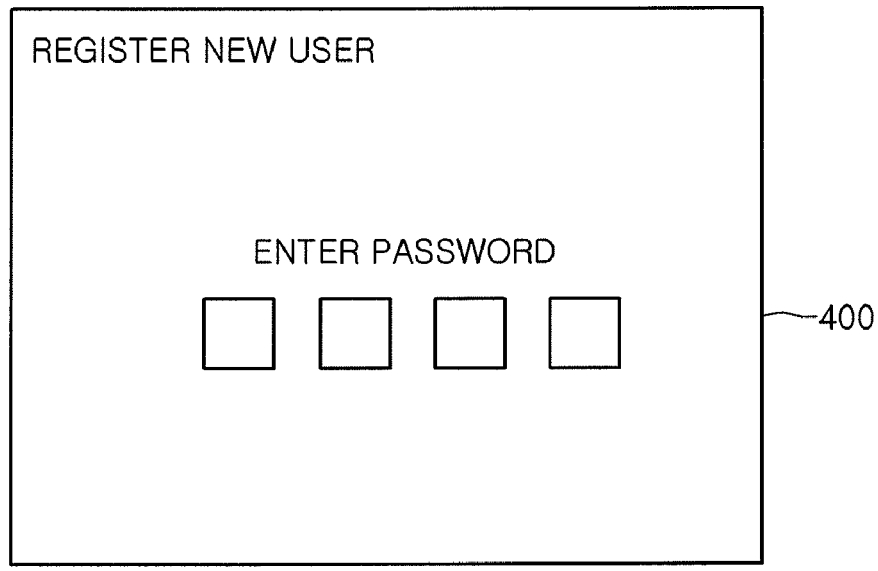

Further, when the user registration for the face region 321 displayed as the user who cannot log in to the video communication apparatus 10 is needed, a password may be requested to be inputted on the screen 400 as shown in FIG. 12. For instance, in order for the user 2 to register for the video communication service, the user 2 may need to select the face region 321 displayed on the screen 400, and then enter or set up appropriate information (e.g., ID/Password information, etc.), which then can be stored in association with the user 2 in the storage unit 130 as part of the pre-registered/registered information. Once the registration is completed, then the user 2 can subsequently access the video communication service according to the user authentication process of FIG. 3 or others.

A display apparatus which may include or may be connected to the video communication apparatus 10 according to an embodiment of the present invention can perform a video communication service by using the wired and/or wireless network(s) with the video communication apparatus 10 and in addition, may perform the user authentication method as described above.

Hereinafter, the display apparatus according to one embodiment of the present invention will be described in detail by using a network TV as an example.

Figure 13:
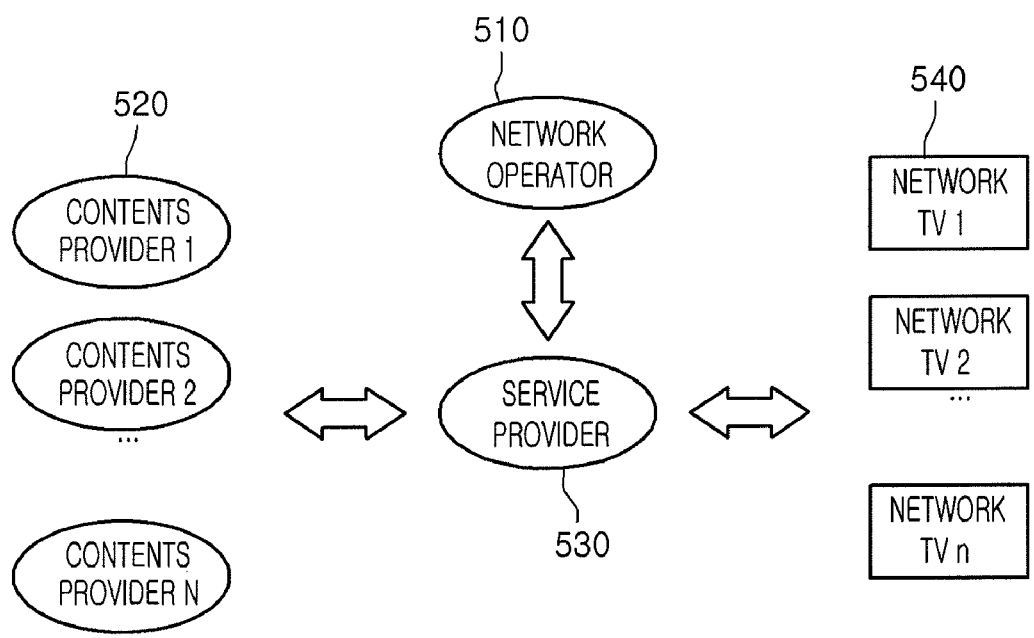
FIG. 13 is a block diagram illustrating one embodiment of a configuration of a display system according to the present invention.

FIG. 13 is a block diagram illustrating one example of a configuration of a display system according to an embodiment of the present invention. The display system may include a network operator 510, one or more contents providers (CP) 520, a service provider 530, and one or more network TVs 540. All components of the display system are operatively coupled and configured.

The network operator 510 may provide base software needed for contents that each contents provider 520 provides to the network TV(s) 540, to the network TV(s) 540. Further, hardware information of each network TV 540 needed for the contents to be properly executed in the network TV 540 may be provided to the contents provider 520.

For example, the network operator 510 provides a main screen configured when contents provided by contents providers are displayed on the network TV 540, and the user selects the contents or inputs various commands to provide a user interface for displaying the resultant output. Further, a role to provide information for updating firmware and/or software of the network TV 540 may also be performed whenever the user interface is needed.

The contents provider 520 may provide the contents according to the request of the network TV 540 by generating various contents which can be provided on the network and configuring the generated contents in a format suitable to be generated on the network TV 540. The contents may be predetermined data which can be serviced through the network.

Firmware exclusively provided for generating and searching the contents and displaying a list for each contents provider 520 may be mounted on or disposed in the network TV 540. This firmware may be installed in the network TV 540 while manufacturing the network TV 540 or the user may install this firmware by downloading the firmware through the network while the user uses the firmware.

Meanwhile, the firmware of the network TV 540 may be program(s) for generating and/or executing the contents provided by the contents provider 520. The firmware may depend on the types of the contents provided by the contents provider 520. For example, when the contents provider 520 is a VOD provider, the firmware may be a VOD generation program and when the contents provider 520 is AOD and MOD providers, the firmware may be AOD and MOD generation programs.

Further, when the contents provider 520 is a video communication provider, the firmware may be a video communication program.

The service provider 530 may be an Internet service provider that provides network communication among the network operator 510, the contents provider(s) 520, and the network TV(s) 540.

The network may include a predetermined wired/wireless Internet network using an Internet protocol. In particular, the service provider 530 transmits the contents provided by the contents provider(s) 520 to the network TV(s) 540, performs maintenance of a transmission network so as to allow the user to stably receive the contents, and provides an infrastructure to transmit the contents to the contents provider(s) 520.

Each network TV 540 may receive and generate or execute the contents through the service provider 530 in response to a user's command. According to one embodiment, the network TV 540 may include a broadcast receiving device such as a network set-top box, etc. and a predetermined device mounted with (or disposed in) a network module such as a network phone, etc. The network TV 540 may represent any device that can display TV signals, broadcast video/audio data, stored video/audio data, or other video contents.

For example, the contents provider 520 may be a provider that produces various contents to be provided to the network TV 540. The contents provider 520 may include a TV broadcasting station, a radio broadcasting station, a VOD provider, an AOD provider, a game provider, a video communication service provider, a weather information provider, a photo-related service provider, etc.

More specifically, the video communication service provider may provide a relay service so as to perform video communication with a user who uses another network TV through the network.

The service provider 530 serves as a medium that transmits data and commands of the network operator 510, the contents provider 520, and the network TV 540. The service provider 530 may be a general wired/wireless Internet service provider. Further, the service provider 530 may perform various communication services such as allocation of an IP address, adjustment of a bandwidth, etc. while providing a communication network hardware so that the network operator 510, the contents provider 520, and the network TV 540 can smoothly communicate with each other.

The network TV 540 basically has a network interface which can be connected to the network, and receives and processes data packets through the network by being allocated with the IP address, and may store or generate the data packets when the data packet contains multimedia data such as video, audio, etc.

Further, the network TV 540 may operate so as to transmit a user's requirements in bidirections while processing the multimedia data and for this, buttons or other input unit for controlling the network TV (e.g., buttons for selecting various menus) may be provided in a remote controller or other device for controlling the network TV 540.

Figure 14:
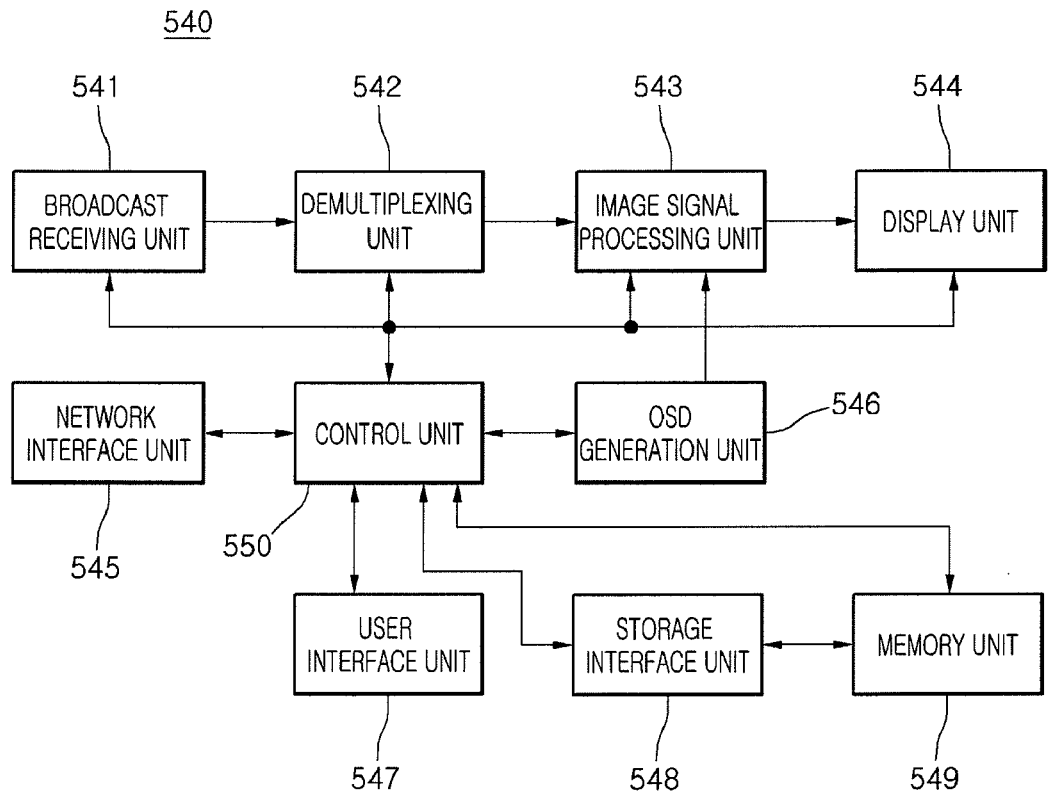
FIG. 14 is a block diagram illustrating a configuration of a display apparatus according to an embodiment of the present invention.

FIG. 14 is a block diagram illustrating a configuration of a display apparatus according to an embodiment of the present invention and illustrates a configuration of the network TV 540 shown in FIG. 13. Although FIG. 14 illustrates an example of the display apparatus being the network TV 540 of FIG. 13, the components shown in FIG. 14 can be applied to other type of network TV 540.

Referring to FIG. 14, the network TV 540 may have a function to receive a broadcasting signal of an RF signal format wirelessly or through a cable by using a broadcast receiving unit 541 in addition to the function to receive the contents through the network.

The network TV 540 may include the broadcast receiving unit 541, a demultiplexing unit 542, an image signal processing unit 543, a display unit 544, a network interface unit 545, an OSD generation unit 546, a user interface unit 547, a storage interface unit 548, a memory unit 549, and a control unit 550. The network TV 540 may further include known components. All the components of the network TV 540 are operatively coupled and configured.

The broadcast receiving unit 541, the demultiplexing unit 542, and the image signal processing unit 543 may constitute one broadcast processing unit that receives broadcasting signals and processes the broadcasting signals into a format suitable to be outputted to the display unit 544 through various processes.

When the contents are digital broadcasts, digital broadcasting signals may be transmitted in a transport stream format packetized by time-division multiplexing a video signal and an audio signal and additional data.

Further, the broadcast receiving unit 541 may include an antenna for receiving the broadcasting signal transmitted from the outside and in addition, may include at least one tuner that tunes to a broadcasting signal having a frequency band corresponding to a tuning control signal of the control unit 550 to be described below, and a demodulator that outputs the tuned broadcasting signal of a predetermined channel in the transport stream format through a vestigial sideband modulation process and an error correction process.

In addition, the broadcasting signal received through the broadcast receiving unit 541 may be separated into various additional data defined by the video signal and the audio signal, program and system information protocol (PSIP) information, etc. by the demultiplexing unit 542 to be outputted in a bit stream format.

The video data separated through the demultiplexing unit 542 is processed by the image signal processing unit 543 to be displayed on the display unit 544. In this case, the image signal processing unit 543 may include an MPEG-2 decoder and a scaler that converts the video data to be suitable for a vertical frequency, the resolution, a screen ratio, etc., based on an output standard of the display unit 544.

Additional data included in the additional data separated through the demultiplexing unit 542 may be stored in the memory unit 549 (or other suitable storage unit such as an optical disc or removable storage medium) through the storage interface unit 548 to be described below, and the memory unit 549 may be implemented by an electrically erasable programmable read-only memory (EEPROM), etc.

The user interface unit 547 as a component for receiving the request commands from the user generally can include an infrared receiving unit that receives an infrared signal inputted through the remote controller or a local key input unit that is provided at one portion of a panel of the remote controller. The user interface unit 547 may further include other input units such as a keyboard, keypad, touch screen, joy stick, etc.

The network interface unit 545 may receive contents or data from the contents provider 520 or the network operator 510 through the network. For example, the network interface unit 545 may receive contents such as a broadcast, a game, a VOD, a broadcasting signal, etc. that are provided from the contents provider through the network and information related thereto. Further, update information and update files of the firmware that are provided by the network operator 510 may be received through the network interface unit 545.

The OSD generation unit 546 generates a menu screen for receiving a user's determination/input signal in the form of on screen display (OSD). For example, the OSD generation unit 546 may display the information related to the contents received through the network interface unit 545 through the display unit 544.

The control unit 550 performs an overall operation control depending on the commands inputted from the user interface unit 547 and may receive and execute the software of the contents provider 20 received from the network operator 510, e.g., the update files of the firmware.

Figure 15:
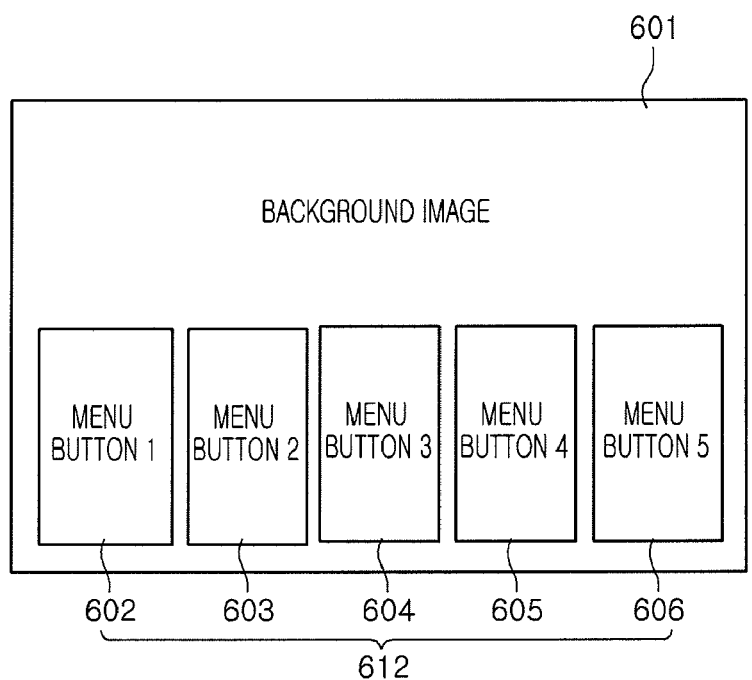
FIG. 15 is a diagram illustrating one embodiment of a configuration of a menu screen displayed on a screen of a display apparatus according to the present invention.

The user authentication method according to the embodiment of the present invention may be performed by the image signal processing unit 543, the control unit 550, the memory unit 549, and the display unit 544. For example, the image signal processing unit 543 may include the face detection unit 110, the feature extraction unit 120, and the user authentication unit 140 shown in FIG. 2 in order to perform the user authentication method described by referring to FIGS. 3 to 12. Further, the control unit 550 can perform the operations of the controller 160, the display unit 544 can perform the operations of the display unit 150, and the memory unit 549 may perform the operations of the storage unit 130. FIG. 15 is a diagram illustrating one embodiment of a configuration of a menu screen displayed on a screen of a display apparatus according to the present invention. The menu screen of FIG. 15 can be displayed on the screen of the display unit 544 or 150.

Referring to FIG. 15, the menu screen of the network TV 540 may include a background image 601 and one or more menu buttons 612 representing a plurality of contents providers, respectively.

The menu buttons 612 displayed on the background image 601 may be buttons for selectively accessing a server for one or more of the plurality of contents providers, and the user accesses a desired contents provider's server by selecting any one of the menu buttons 612 to receive the contents service. Here the menu buttons 612 are mere examples, and can be other types of selecting mechanisms. Further the screen on which the menu buttons 612 are displayed can be a touch screen so that the menu buttons 612 may be selected by touching the buttons 612 or by selecting them using the input unit of the network TV 540 or video communication apparatus 10.

According to an embodiment of the present invention, at least one of the plurality of contents providers provides the video communication service, and one of the menu buttons 612 displayed on the menu screen of the network TV 540, for example, a menu button 4 (605) may thus be a button corresponding to the video communication service. For instance, each of the menu buttons 602, 603, 604, 605, 606 can be used to select a service, operation or function assigned thereto.

In one example, the user selects the menu button 4 (605) among the menu buttons 612 displayed on the menu screen of the network TV 540 to access the server of the contents provider that provides the video communication service.

Meanwhile, after the server of the contents provider that provides the video communication service by the above-mentioned method is accessed, the use authentication method according to the embodiments of the present invention described by referring to FIGS. 3 to 12 may be performed by the network TV 540 or video communication apparatus 10.

Further, at least some steps of the user authentication method described by referring to FIGS. 3 to 12 may be performed by a server of the contents provider 520, a server of the server provider 530, or a server of the network operator 510.

According to another embodiment of the present invention, the video communication apparatus 10 may transmit the user authentication result acquired in accordance with the user authentication method to an external apparatus.

For example, the video communication apparatus 10 may transmit information on the registered users, users who are currently positioned in front of the video communication apparatus 10 among the registered users, a user who logs in the video communication apparatus 10, and an unregistered user who is currently positioned in front of the video communication apparatus 10 to the external apparatus. The external apparatus can be any device external to the video communication apparatus 10, and can be another video communication apparatus, one of the apparatuses 20-60, the devices of FIG. 13, etc.

As shown in FIG. 8, the video communication apparatus 10 may transmit information indicating that a user 1, a user 3, and a user 4 (corresponding to the face regions 311, 331, 341) among the registered users are currently positioned in front of the video communication apparatus 10 to the external apparatus.

Meanwhile, the external apparatus may display the received user authentication result on the screen of the external apparatus, and by viewing the displayed result, the user who is currently using the external apparatus may recognize users who are positioned in front of the video communication apparatus 10 and thereby know who the users are who can currently perform the video communication with the user at the external apparatus.

As a result, the user of the external apparatus can select one or more of the users who are positioned in front of the video communication apparatus 10 to attempt the video communication with them through the external apparatus and video communication apparatus 10 and verify the position of a predetermined user.

Hereinafter, embodiments of the method for displaying the user authentication result will be described by using the display system shown in FIGS. 13 and 14 as an example.

The network TV 1 (540) performs the user authentication by using the methods described by referring to FIGS. 1 to 12 and may transmit the user authentication result to the external apparatus, for example, the server of the contents provider 520 or another network TV.

More specifically, the network TV 1 (540) may transmit the user authentication result to the server of the contents provider 1 (520) that provides the video communication service and the network TV 2 may receive the user authentication results for the network TV 1 (540) from the same server. Such operation may occur via the service provider 530.

If the network TV 2 receives the user authentication results for the network TV 1 on the screen of the network TV 2 and as a result, the user at the network TV 2 may determine whether or not any of the users at the network TV 1 (e.g., users positioned in front of the network TV 1 and captured by the image signal processing unit 543 of the network TV 1) can perform the video communication with the user at the network TV 2 or can know the positions/movement of the users at the network TV 1.

Figure 16:
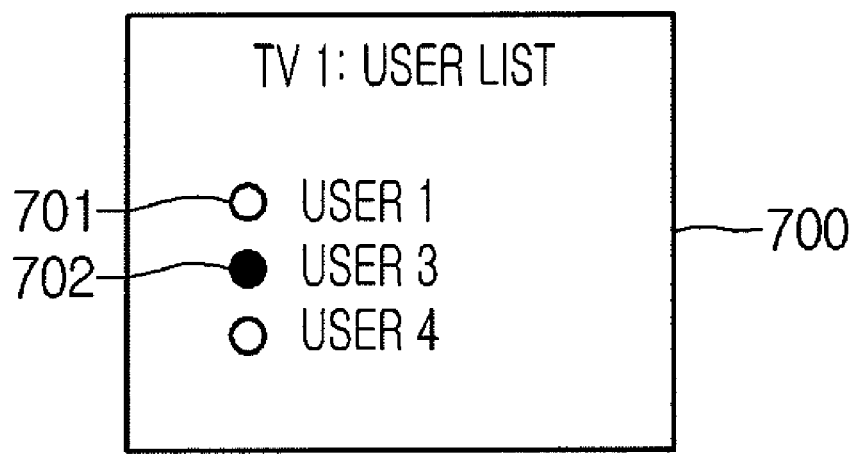
FIGS. 16 to 18 are diagrams illustrating embodiments of a method for displaying a user authentication result according to the present invention.

Referring to FIG. 16, the network TV 2 may display, on a screen of the network TV 2, a user list window 700 including the user authentication results or other information for the users of the network TV 1. For instance, information on the users who are currently positioned in front of the network TV 1 among the users registered to the network TV 1 may be displayed on the user list window 700. In the example of FIG. 16, users 1, 3 and 4 are listed as the network TV 1's registered users, which are shown on the window 700 displayed on the screen of the network TV 2. The user information displayed on the user list window 700 may include texts or images and more specifically, may include user information such as the ID, a nickname, an icon, or the like of a corresponding user.

Further, when the network TV 1 (540) transmits the face region image detected by the above-mentioned method, this image is received by the network TV 2 and can be displayed on the screen of the network TV 2 such that a face image of a user currently photographed at the network TV 1 may be displayed on the user list window 700 displayed on the screen of the network TV 2 (or other device communicating with the network TV 1).

Meanwhile, images or indications 701 and 702 for representing a current state of the user may be marked on the user list window 700. For example, the user marked with the first image/indication 701 is a registered user who is currently positioned in front of the network TV 1 but has not logged in to the video communication apparatus 10. The user marked with the second image/indication 702 is a registered user who is currently positioned in front of the network TV 1 540 and is logged in to the video communication apparatus 10. As mere examples only, the first indication 701 is a mere circle (not filled in) where the second indication 702 is a filled-in circle. Obviously, other marks, symbols, icons, colors, texts, images, or indications can be used for rendering the status of each user on the displayed user list.

In the example of FIG. 16, the user 1, the user 3, and the user 4 are registered users who are currently positioned in front of the network TV 1 (540) and among them, only user 3 is currently logged in to the video communication apparatus 10.

Further, information on both the registered user who is not currently positioned in front of the network TV 1 540 and the unregistered user that is currently positioned in front of the network TV 1 540 may be displayed on the user list window 700. For example, the registered user who is not currently positioned in front of the network TV 1 may be the user whose face region is not detected among the registered users, and the unregistered user who is currently positioned in front of the network TV 1 540 may be the user who is not authenticated among the users whose face regions are detected. Such information may be included in the user authentication result transmitted from the network TV 1. In this regard, an example of FIG. 17 is provided.

Figure 17:
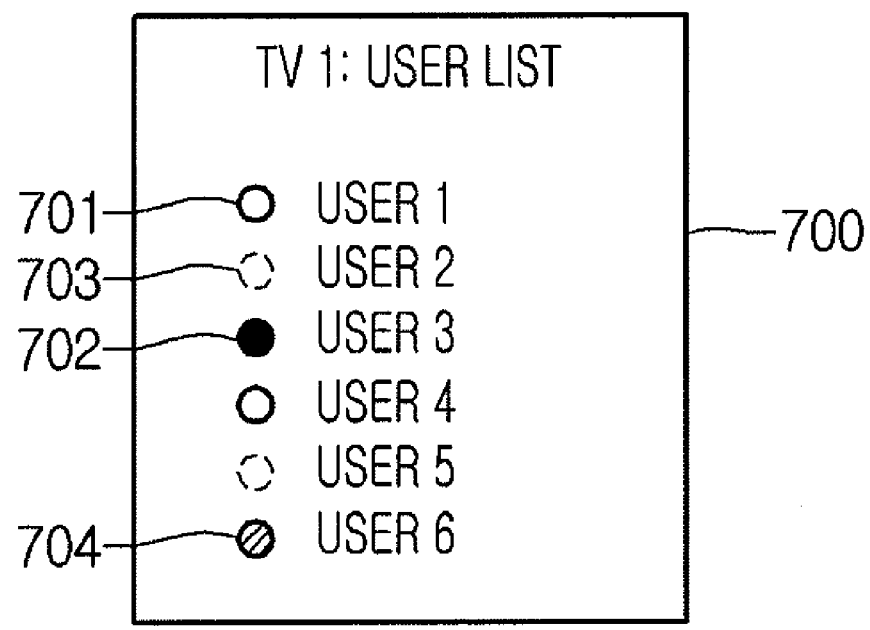

Referring to FIG. 17, the network TV 2 receives the network TV 1's user list information and displays it as shown on the screen of the network TV 2. In this example, a user marked with a third image/indication 703 may be an unregistered user who is currently positioned in front of the network TV 1, and a user marked with a fourth image/indication 704 may be a registered user who is not currently positioned in front of the network TV 1.

For example, the user at the network TV 2 can find, by viewing and using the user list window 700 shown in FIG. 17, that the users 1 to 5 are currently positioned in front of the network TV 1, the users 1, 3, and 4 among the users 1-5 are the registered users, the user 3 currently is logged in to the video communication apparatus 10, the users 2 and 5 among the users 1-5 are not registered users, and the user 6 is a registered user who is not currently positioned in front of the network TV 1.

Therefore, the user of the network TV 2 can select any one of the registered users who are currently positioned in front of the network TV 1 (e.g., among the users 1, 3 and 4) to attempt the video communication with the selected user.

Moreover, the displayed user list may be updated periodically, in real time or as needed (e.g., whenever there is a status change) so that the status of each relevant user may be displayed on the window 700 at the network TV 2 (and/or the network TV 1). For example, in the example of FIG. 17, if at a subsequent time, the user 1 moves away from the network TV 1 and is no longer captured by the camera of the network TV 1, then the mark next to the user 1 on the window 700 can change from the first indication 701 (which indicates a registered user who is currently in front of the network TV 1) to the fourth indication 704 (which indicates a registered user who is currently not in front of the network TV 1). In another example, subsequently, if the user 2 who was not registered registers for the video communication service, then the mark next to the user 2 in FIG. 17 may change from the third indication 703 to the first indication 701. In order for the unregistered user 2 to register, the user 2 may select the user 2 on the screen of the user 2's network TV, which in turn provides menu items/screens for the user 2 to register oneself for the video communication service. In another example, subsequently, if a new user 7 appears in front of the network TV 1, then the user 7 will be displayed on the window 700 with the third indication 703.

Further, the network TV 2 may receive the user authentication result for the users who are positioned in front of each of the plurality of network TVs and may also display the transmitted user list for each of the plurality of network TVs on the screen of the network TV 2, which will be discussed referring to FIG. 18. In this regard, the user lists can be separately identified so that the user at the network TV 2 can know users for each network TV. Further, user information (e.g., picture ID, name, nick name, e-mail address, phone number, etc.) may be displayed as part of the user list on the window 700 so that the user at the network TV 2 can easily recognize the users who are on the lists. The operation of displaying the user authentication result of other network TVs/devices on a particular network TV/device and selecting the user(s) based on the authentication result by the particular network TV/device for video communication services and other services, can be performed at any of the network TVs/devices and apparatuses 10-60.

Figure 18:
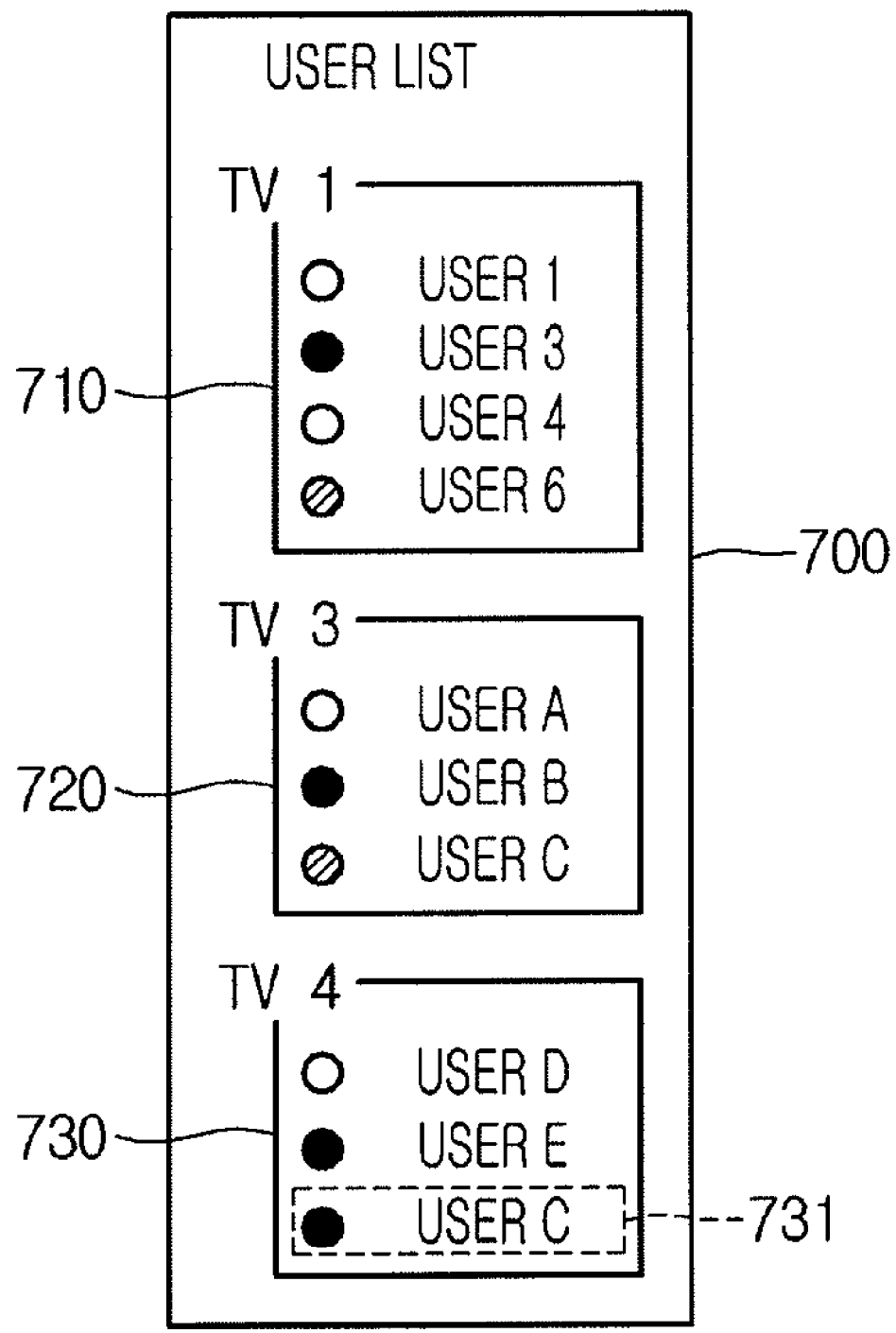

Referring to FIG. 18, in this example, the network TV 2 may receive the user authentication results for the network TV 3 and the network TV 4 in addition to the network TV 1 and may display the user list for each network TV on the window 700 displayed on the screen of the network TV 2.

For example, the user list window 700 may include sub-lists 710, 720, and 730 corresponding respectively to the network TVs 1, 3 and 4 and each sub-list may display the user authentication result of the corresponding network TV.

For example, the sub-list 710 for the network TV 1 may indicated that the users 1, 3, and 4 among the registered users 1, 3, 4 and 6 are currently positioned in front of the network TV 1 to perform the video communication, the user 3 logged in to a video communication apparatus 10 (which may be part of the network TV 1), and the user 6 is not currently positioned in front of the network TV 1.

Further, the sub-list 720 for the network TV 3 may indicate that a user A and a user B among the registered users A, B and C are currently positioned in front of the network TV 3 to perform the video communication, the user B logged in to a video communication apparatus 10 (which may be part of the network TV 3), and the user C is not currently positioned in front of the network TV 3.

Meanwhile, the sub-list 730 for the network TV 4 may indicate that a user D, a user E, and the user C among the registered users D, E and C are currently positioned in front of the network TV 4 to perform the video communication, and the users E and C are logged in to a video communication apparatus 10 (which may be part of the network TV 4).

By using the user list window 700 shown in FIG. 18, the user of the network TV 2 may easily determine the positions of the users of the network TVs and whether or not the users can perform the video communication with each other.

For example, when the user of the network TV 2 attempts video communication with the user C, the user of the network TV 2 may find that the user C is not currently positioned in front of the network TV 3 in view of the user list window 700 and attempts the video communication by selecting the user C 731 displayed on the list for the network TV 4. In the similar manner, the user lists may be displayed the screen of each of the network TVs 1, 3 and 4. For instance, on the screen of the network TV 1, the user lists for the network TVs 2, 3 and 4 may be displayed. Further on the screen of each network TV, the user list for its own network TV may also be displayed. For instance, in addition to the user list window 700 of FIG. 18, the screen of the network TV 2 may further display the user list for the network TV 2 itself. Moreover, if there is any video communication that is currently active, such active status (and the users involved therein) may also be indicated on the screen of the network TV 2.

Although the user authentication is performed by detecting the user's face region, the user authentication method according to the embodiments of the present invention may be, in the same manner, performed by photographing other body part(s) of the user, for example, parts by which the user can be identified by using the camera 100 provided in the video communication apparatus 10, such as a fingerprint, an iris, etc.

Further, the user authentication method according to the present invention may be stored in a computer-readable recording medium by being produced as a program to be executed in a computer. The computer software for implementing the user authentication methods of the invention may be stored on the computer-readable recording medium. An example of the computer-readable recording medium includes a ROM, a RAM, a CD-ROM, an optical disc, a memory stick, a magnetic tape, a floppy disk, an optical data storage, etc. and in addition, also includes a form of a carrier wave (e.g., transmission through the Internet or other network).

The computer-readable recording media are distributed on computer systems connected through network(s), and thus a computer-readable code may be stored and executed by a distribution scheme. In addition, a functional program, a code, and code segments for implementing the broadcast receiving method will be easily interred by programmers skilled in the art.

According to an embodiment of the present invention, by performing user authentication for a video communication system by comparing a face region detected for each of a plurality of users with pre-registered information, it is possible to easily perform user authentication without an additional user input such as inputting characters or numerals and efficiently register and manage information on the plurality of users.

Further, it is possible to improve the usage convenience of a video communication system by the plurality of users by displaying the face regions detected for the plurality of users on a screen and using the displayed face regions for the user selection and user authentication.

Although preferred embodiments of the present invention have been illustrated and described, the present invention is not limited to the above-mentioned embodiments and various modified embodiments can be available by those skilled in the art without the scope of the appended claims of the present invention. In addition, these modified embodiments should not be appreciated separately from technical spirits or prospects.

What is claimed is:

1. A method for user authentication in a video communication apparatus, the video communication apparatus including a user authentication unit, the method comprising:
   receiving image data of a plurality of users;
   detecting a face region of each of the plurality of users by using the received image data;
   performing, by the user authentication unit, a user authentication by comparing face feature information corresponding to each of the detected face regions with pre-registered face feature information;
   dividing the detected face regions into face regions for authenticated users and face regions for unauthenticated users in accordance with the user authentication result;

permitting, by the user authentication unit, an access to a video communication service by a user corresponding to at least one of the detected face regions using the user authentication result; and displaying the face regions for the authenticated users and the face regions for the unauthenticated users differently on a screen associated with the video communication apparatus.

2. The user authentication method according to claim 1, wherein the permitting step automatically allows the access to the video communication service by the user corresponding to at least one of the detected face regions, if the face feature information of said user correlates with the pre-registered face feature information.

3. The user authentication method according to claim 1, wherein the performing step includes:
   extracting the face feature information from each of the detected face regions;
   comparing the extracted face feature information from each of the detected face regions with the pre-registered face feature information; and
   authenticating a user corresponding to one of the detected face regions when the extracted face feature information for said one of the detected regions substantially coincides with the pre-registered face feature information according to the comparison result.

4. The user authentication method according to claim 1, further comprising:
   automatically logging off, for the video communication service, a user corresponding to one of the detected face regions when a face region of said user is no longer detected by an image capturing unit of the video communication apparatus.

5. The user authentication method according to claim 1, wherein the permitting step includes:
   automatically logging in, for the video communication service, the user corresponding to at least one of the detected face regions.

6. The user authentication method according to claim 1, further comprising:
   displaying, on the screen, the user authentication result for each of the detected face regions.

7. The user authentication method according to claim 1, further comprising:
   receiving a selection of any one of the face regions for the authenticated users displayed on the screen, wherein the permitting step permits the user corresponding to the selected face region to access the video communication service using the video communication apparatus.

8. The user authentication method according to claim 1, further comprising:
   receiving a selection of one of the face regions for the unauthenticated users displayed on the screen; and
   registering face feature information of the selected face region for the video communication service.

9. The user authentication method according to claim 1, further comprising:
   transmitting the user authentication result to an external apparatus, wherein the user authentication result is displayed on an external display associated with the external apparatus.

10. A video communication apparatus, comprising:
    a face detection unit configured to detect a face region of each of a plurality of users based on received image data of the plurality of users;
    a user authentication unit configured to perform a user authentication by comparing face feature information corresponding to each of the detected face regions with pre-registered face feature information, to permit an access to a video communication service by a user corresponding to at least one of the detected face regions using the user authentication result, and to divide the detected face regions into face regions for authenticated users and face regions for unauthenticated users in accordance with the user authentication result; and
    a display unit including a screen and configured to display the face regions for the authenticated users and the face regions for the unauthenticated users differently on the screen.

11. The video communication apparatus according to claim 10, wherein the user authentication unit automatically allows the access to the video communication service by the user corresponding to at least one of the detected face regions, if the face feature information of said user correlates with the pre-registered face feature information.

12. The video communication apparatus according to claim 10, wherein the user authentication unit performs the user authentication by:
    extracting the face feature information from each of the detected face regions;
    comparing the extracted face feature information from each of the detected face regions with the pre-registered face feature information; and
    authenticating a user corresponding to one of the detected face regions when the extracted face feature information for said one of the detected regions substantially coincides with the pre-registered face feature information according to the comparison result.

13. The video communication apparatus according to claim 10, wherein the user authentication unit is further configured to:
    automatically log off, for the video communication service, a user corresponding to one of the detected face regions when a face region of said user is no longer detected by an image capturing unit of the video communication apparatus.

14. The video communication apparatus according to claim 10, wherein the user authentication unit permits the access to the video communication service by automatically logging in, for the video communication service, the user corresponding to at least one of the detected face regions.

15. The video communication apparatus according to claim 10, wherein the display unit is further configured to display, on the screen, the user authentication result for each of the detected face regions.

16. The video communication apparatus according to claim 10, further comprising:
    an input unit configured to receive a selection of any one of the face regions for the authenticated users displayed on the screen, wherein the user authentication unit permits the user corresponding to the selected face region to access the video communication service using the video communication apparatus.

17. The video communication apparatus according to claim 10, further comprising:
    an input unit configured to receive a selection of one of the face regions for the unauthenticated users displayed on the screen, for registering face feature information of the selected face region for the video communication service.

* * * * *